US008585999B2

(12) United States Patent
Keister

(10) Patent No.: US 8,585,999 B2
(45) Date of Patent: Nov. 19, 2013

(54) METHOD OF MAKING FLOW-THROUGH-RESIN-IMPREGNATED MONOLITHIC GRAPHITE ELECTRODE AND CONTAINERLESS ELECTROLYTIC CELL COMPRISING SAME

(75) Inventor: Timothy Edward Keister, Brockway, PA (US)

(73) Assignee: ProChemTech International, Inc., Brockway, PA (US)

( * ) Notice: Subject to any disclaimer, the term of this patent is extended or adjusted under 35 U.S.C. 154(b) by 72 days.

(21) Appl. No.: 13/075,272

(22) Filed: Mar. 30, 2011

(65) Prior Publication Data

US 2011/0174633 A1   Jul. 21, 2011

Related U.S. Application Data

(60) Division of application No. 11/807,402, filed on May 29, 2007, now Pat. No. 7,927,470, which is a continuation-in-part of application No. 11/193,609, filed on Jul. 29, 2005, now abandoned, which is a division of application No. 10/448,793, filed on May 30, 2003, now abandoned.

(60) Provisional application No. 60/385,269, filed on Jun. 4, 2002.

(51) Int. Cl.
*B32B 37/10* (2006.01)
*B32B 27/04* (2006.01)

(52) U.S. Cl.
USPC .................. 423/448; 204/280; 204/290.01

(58) Field of Classification Search
USPC ........................................... 204/280, 290.01
See application file for complete search history.

(56) References Cited

U.S. PATENT DOCUMENTS

| 2,825,685 | A | | 3/1958 | Schachter et al. |
| 2,882,210 | A | | 4/1959 | Jenks |
| 3,116,227 | A | | 12/1963 | Scarberr |
| 3,305,472 | A | * | 2/1967 | Oldershaw et al. ........... 204/268 |
| 3,375,132 | A | | 3/1968 | Geise |
| 3,766,037 | A | | 10/1973 | Lee |
| 3,855,104 | A | | 12/1974 | Messner |

(Continued)

FOREIGN PATENT DOCUMENTS

EP    0 243 846 A2    11/1987

OTHER PUBLICATIONS

International Search Report in International Patent Application No. PCT/US03/17687, dated Aug. 29, 2003.

*Primary Examiner* — Keith Hendricks
*Assistant Examiner* — Salil Jain
(74) *Attorney, Agent, or Firm* — Kilyk & Bowersox, P.L.L.C.

(57) ABSTRACT

An electrolytic cell is provided that can include: a first electrode plate including a first surface that can include a graphite material; a second electrode plate including a second surface that can include a graphite material opposing the first surface; an electrolytic reaction zone between the first surface and the second surface; and an inlet to and an outlet from the electrolytic reaction zone. The first electrode plate and the second electrode plate can include resin-impregnated monolithic graphite plates. The first electrode plate and the second electrode plate can form opposite internal walls of a chamber for the electrolytic reaction and thus can be provided without a container for containing the electrode plates. Methods are also provided for flow-through-resin-impregnating porous, monolithic graphite plates to form electrode plates.

18 Claims, 7 Drawing Sheets

(56) References Cited

U.S. PATENT DOCUMENTS

| | | | |
|---|---|---|---|
| 4,140,616 A | 2/1979 | Wheatley et al. | |
| 4,172,773 A | 10/1979 | Pellegri et al. | |
| 4,188,464 A | 2/1980 | Adams et al. | |
| 4,217,336 A * | 8/1980 | Maire et al. | 423/448 |
| 4,255,466 A | 3/1981 | Natsume et al. | |
| 4,265,727 A * | 5/1981 | Beckley | 204/242 |
| 4,317,709 A | 3/1982 | Ichisaka et al. | |
| 4,519,889 A | 5/1985 | Pellegri et al. | |
| 4,761,208 A | 8/1988 | Gram et al. | |
| 4,782,586 A * | 11/1988 | Joo et al. | 29/623.5 |
| 5,045,298 A * | 9/1991 | Muramatsu et al. | 423/445 R |
| 5,254,226 A | 10/1993 | Williams et al. | |
| 5,308,507 A | 5/1994 | Robson | |
| 5,346,683 A | 9/1994 | Green et al. | |
| 5,372,688 A * | 12/1994 | Patterson | 204/222 |
| 5,385,650 A | 1/1995 | Howarth et al. | |
| 5,429,723 A * | 7/1995 | Atkinson | 205/556 |
| 5,679,239 A | 10/1997 | Blum et al. | |
| 5,798,075 A | 8/1998 | Moore | |
| 5,863,452 A * | 1/1999 | Harshberger et al. | 249/83 |
| 5,868,911 A | 2/1999 | Blum et al. | |
| 6,106,691 A | 8/2000 | Nakamura et al. | |
| 6,113,853 A | 9/2000 | Nakamura et al. | |
| 6,165,343 A | 12/2000 | Blum et al. | |
| 6,261,464 B1 | 7/2001 | Herrington et al. | |
| 6,306,281 B1 | 10/2001 | Kelley | |
| 6,375,991 B1 | 4/2002 | Moore, Jr. | |
| 6,395,155 B1 | 5/2002 | Bressel et al. | |
| 7,048,842 B2 * | 5/2006 | Tremblay et al. | 205/499 |
| 7,108,917 B2 * | 9/2006 | Klug | 428/408 |
| 2003/0006144 A1 | 1/2003 | Tremblay et al. | |

\* cited by examiner

METHOD OF MAKING FLOW-THROUGH-RESIN-IMPREGNATED MONOLITHIC GRAPHITE ELECTRODE AND CONTAINERLESS ELECTROLYTIC CELL COMPRISING SAME

CROSS REFERENCE TO RELATED APPLICATION

The present application is a Divisional Application of U.S. patent application Ser. No. 11/807,402, filed May 29, 2007, which is a Continuation-in-Part of U.S. patent application Ser. No. 11/193,609, filed Jul. 29, 2005, which is a Divisional Application of U.S. patent application Ser. No. 10/448,793 filed May 30, 2003, that claims benefit under 35 U.S.C. §119(e) from earlier filed U.S. Provisional Application No. 60/385,269, filed Jun. 4, 2002, both of which are herein incorporated by reference in their entireties.

FIELD

The present teachings relate to an electrolytic cell, methods of making resin-impregnated graphite electrodes, methods for electrolytic production of electrolytic bromine, and the production of biocides for industrial cooling systems using an electrolytic cell.

BACKGROUND

In many industrial and commercial processes excess heat can be generated, and the heat can typically be removed from the process by means of cooling water. Comfort cooling of living and work spaces can generate excess heat that can be removed from the air conditioning equipment by means of cooling water. The term "cooling water" is thus utilized to describe water that flows through equipment to absorb and remove heat. Equipment can include, for example, air conditioning units, engine jackets, refrigeration systems, and industrial heat exchangers. Equipment can be found in, for example, in the glass, automotive, chemical, steel, and petroleum industries; as well as commercial properties.

Water, due to its low cost and physical properties, can be a suitable material for transfer of heat and use as an evaporative cooler. Unfortunately, warm water, with dissolved and suspended solids, can be a medium for growth of microorganisms. An uncontrolled growth of microorganisms in re-circulating cooling water systems can create several severe problems, for example, increased risk of Legionnaires' disease; plugging due to physical blockage of cooling water passages; accelerated corrosion under biological masses; and/or reduced heat exchanger efficiency due to bio-fouling of surfaces.

These problems can be amplified by an increased desire in various industries to minimize water usage and wastewater discharge via increasing the concentration (cycles) at which cooling towers are operated, and the use of reclaimed wastewater as cooling tower makeup water. The solids and nutrient content of the cooling water can increase when a cooling tower is operated at higher cycles and/or with reclaimed wastewater as makeup. This makes the cooling water environment even more conducive to microbiological growth.

Current microbial fouling control programs rely upon various oxidizing and non-oxidizing biocides, that while often effective, can have numerous problems, for example, high costs, severe health and safety concerns, low efficiency, and incompatibility with other chemical products needed to operate at higher cycles.

Oxidizing biocides, such as chlorine, ozone, and chlorine dioxide, while cost effective at low dosages, can have the following disadvantages or a combination thereof:

many oxidizers, such as chlorine, can be dangerous to handle;

most oxidizers can react with many of the common scale and corrosion inhibitors used in cooling water treatments;

organic oxidizers, such as hydantoin and n,n,dibromosulfamate, can be costly;

many oxidizers, such as ozone, can be volatile, resulting in higher usage and potential air pollution problems;

chlorine based oxidizers can have unwanted reactions with various organics, causing potential discharge problems.

In addition to these problems, chlorine based products can lose much of their effectiveness as the water pH increases. The increasing popularity of alkaline water treatment programs, commonly operated at pH levels about 8.0 su, can thus make chlorine based products unusable for biological control.

Non-oxidizing biocides, such as dithiocarbamate, isothiazolin, and glutaraldehyde; while avoiding some of the problems related to oxidizers, can have the following problems during application. Recent research has shown that non-oxidizers can be ineffective against the Legionnaires' disease bacterium. Non-oxidizers can be very high use cost products, some, such as isothiazolin, are very dangerous to handle. Many non-oxidizers can have very slow reaction times, making them impractical to use in short half-life systems. Due to development of resistant organism populations, non-oxidizers can lose effectiveness and may need to be rotated. Further, some non-oxidizers can be highly regulated due to potential environmental problems.

Previously, electrolytic cells have been constructed from graphite purchased from a number of suppliers, such as St. Marys Carbon Company and Carbone Lorraine, both of St. Marys, Pennsylvania. This graphite, of high purity but varying density, could be made into a plate, then impregnated with a resin, to make the plate impervious to the passage of water. It has been found that processes of impregnation have presented a number of problems. If the process involves placing the graphite plate in a vacuum—pressure chamber, drawing a vacuum for a period of 1 to 4 hours, introducing the impregnating resin, then pressurizing the chamber at up to 100 psig for a period of 1 to 24 hours, problems arise. These problems include problems with insufficient impregnation and insufficient penetration of the resin into the pores of the graphite plate. Upon release of pressure, treatment in an oven for 4 to 24 hours at temperatures up to 300° F., and repeating the entire process three times, problems were still encountered once the impregnated graphite plate was assembled into an electrolytic cell. Assembled cells using such impregnated plates would fail pressure tests with water at 80 psig for 24 hours, and the graphite plates would show leakage through the plates. Attempts to repair a leaking plate would require oven drying the plate to remove water, followed by a repeat of the entire impregnation process.

Furthermore, anisostatically pressed and extruded graphites exhibit both directional porosity and density gradations, and have been found to make inferior electrolytic cell components due to rapid overall breakdown and uneven wear, leading to premature failure of the cell.

Other problems with various electrolytic cell designs include problems with rectangular designs mounted horizontally. Such designs accumulate gas in the top of the cell producing a zone of little or no wear and causing a lack in passage of electrical current through that portion of the cell. The resultant increased amperage through the remaining surface area of the cell can accelerate wear of that surface and result in a quicker failure of the cell. Moreover, in addition to the low wear zone in the top of the cell from gas accumulation, a zone of very high wear has been found in the bottom of rectangular electrolytic cells. It is believed that this accelerated wear results from accumulation of elemental bromine, which is substantially heavier than water, at the bottom of an operating cell. Accelerated chemical attack on the graphite in the bottom of such cells results because elemental bromine is a very strong oxidizer.

SUMMARY

According to various embodiments, an electrolytic cell can be provided that includes a first electrode comprising a flow-through-resin-impregnated monolithic graphite plate having a first surface, a second electrode comprising a flow-through-resin-impregnated monolithic graphite plate having a second surface opposing the first surface; an electrolytic reaction zone including an electrolytic zone surface area between the first surface and the opposing second surface; an inlet to the electrolytic reaction zone; and an outlet from the electrolytic reaction zone. The electrolytic reaction zone can be a closed-cell such that all fluid flowing through the electrolytic cell flows along a flow path through the inlet, through the electrolytic zone, and through the outlet. The electrolytic cell can be free of a container for containing the electrodes. An electrolytic solution stream can flow along a flow path from the inlet to the outlet and through the electrolytic reaction zone at a desired flow rate and can be capable of directing an entire cross-section of the electrolytic solution stream to completely flow between the opposing first and second surfaces. The first electrode plate and the second electrode plate can include impregnated graphite. The first electrode plate and the second electrode plate can essentially form a chamber for the electrolytic reaction.

According to various embodiments, a method of flow-through-impregnating a porous, monolithic graphite plate with a flowable, hardenable resin is provided, as is a device for carrying out the method. In some embodiments, the plate can comprise an isostatically pressed high density graphite that is impregnated using an anisostatic impregnation process.

According to various embodiments, a method of electrolytic production of electrolytic bromine is also provided. The method can include providing an electrolytic cell; providing an electrolytic solution stream that includes sodium bromide, sodium chloride, and at least one of an aqueous solution, an aqueous mixture, water, or a combination thereof; and providing power to the first electrode plate and the second electrode plate. The electrolytic cell used for the method can include: a first electrode plate including a first surface; a second electrode plate including a second surface opposing the first surface; an electrolytic reaction zone including an electrolytic zone area between the first surface and the opposing second surface; an inlet to the electrolytic reaction zone; and an outlet from the electrolytic reaction zone. The electrolytic zone used for the method can be a closed-cell zone such that all fluid that flows into the inlet through the electrolytic reaction zone and through the outlet. The electrolytic solution stream can be directed through an entire cross-section of the stream to completely flow between the opposing first and second surfaces.

BRIEF DESCRIPTION OF THE DRAWINGS

The present teachings are described in more detail below and with reference to the exemplary embodiments shown in the attached drawings which are intended to illustrate, not limit, the present teachings.

DESCRIPTION OF THE VARIOUS EMBODIEMENTS

Figure 1:
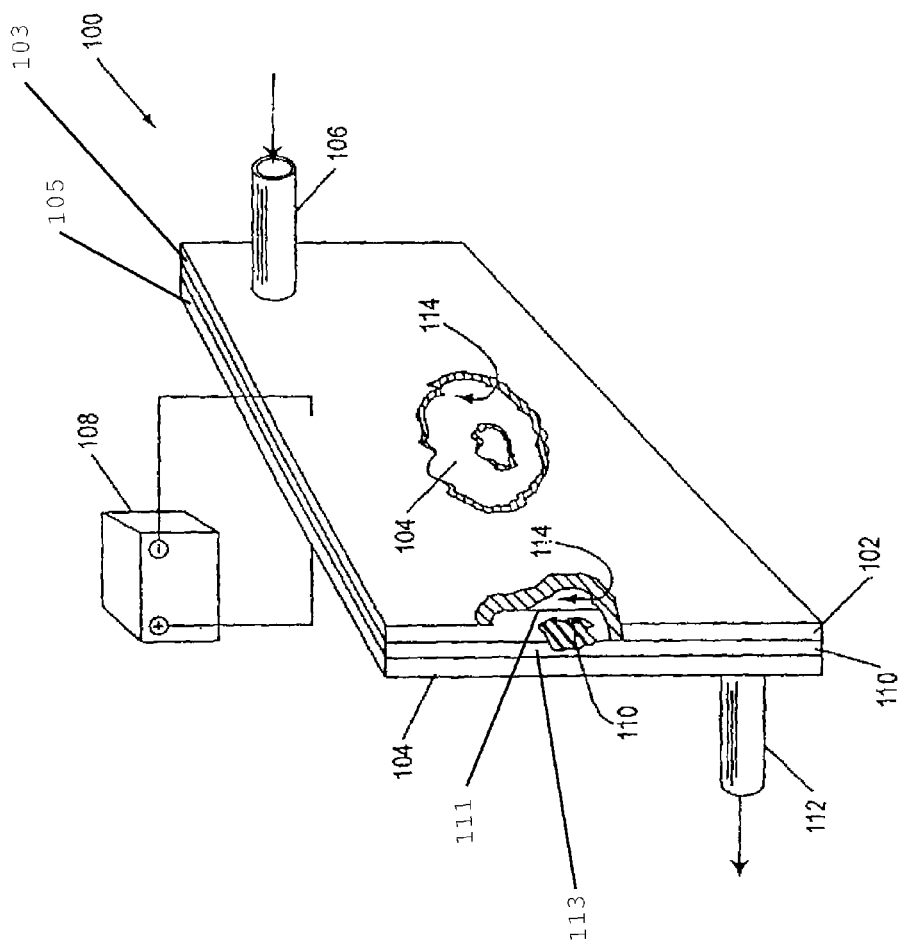
FIG. 1 is a perspective view of an electrolytic cell according to various embodiments.

With reference to the drawings, according to various embodiments an electrolytic cell is depicted in FIG. 1 which is a perspective view of an electrolytic cell 100. A first electrode plate 102 and a second electrode plate 104 can be separated, sandwiched, and/or spaced-apart by an insulating and/or non-conducting spacer 110. Insulating and/or non-conducting spacer 110 has an inside peripheral edge 111 and an outside peripheral edge 113. An electrical power supply 108 can provide electrical power to the first electrode plate 102 and the second electrode plate 104. The first electrode plate 102, insulating spacer 110, and the second electrode plate 104 can define a chamber and/or an electrolytic reaction zone 114. The insulating spacer 110 can be present along the periphery of the first electrode plate 102 and the second electrode plate 104, for example, as a gasket. First electrode plate 102 has an outer peripheral edge 103 and second electrode plate 104 has an outer peripheral edge 105. An inlet 106 and an outlet 112 can be used to provide a flow of a fluid and/or an electrolytic solution through the chamber 114 in the electrolytic cell 100. The direction of the flow is depicted by the unmarked arrows proximate to the inlet 106 and the outlet 112 in FIG. 1. Partial cut-away views of the first electrode plate 102, the second electrode plate 104, and the insulating spacer 110 can be seen in FIG. 1. The interior chamber 114 can be seen in both the partial cut-outs. The first electrode plate 102 and the second electrode plate 104 can include a graphite material impregnated with one or more resins impervious to water diffusion. The first electrode plate 102 and the second electrode plate 104 can be chemically resistant to the products of electrolysis.

According to various embodiments, the first electrode plate and the second electrode plate can include a graphite material, for example, an electrolytic grade graphite. Electrolytic graphite can be pure graphite produced by conversion of carbon to graphite. Electrolytic graphite can be produced in an electric furnace. The graphite can be electrolytic grade graphite that can be vacuum and pressure impregnated with a resin, for example, a hardenable resin to form impregnated electrolytic grade graphite. The graphite plates can also be manufactured by combining powered electrolytic grade graphite with various thermoset or thermoplastic plastic, resin powder(s). The graphite plates can be molded into an electrode in a heated press by means of filling a mold with the mixed powders and then compressing them with sufficient heat to fusion the resin(s) present.

According to various embodiments of the present teachings, a process is provided that obviates the need for an expensive vacuum-pressure chamber in an impregnation process. In some embodiments, an electrolytic cell is constructed of non-impregnated graphite plate components and then the electrolytic cell is internally pressurized, via a pump, with an impregnating resin. The internal pressurization can occur for a suitable period of time, for example, for about one or more hours, for 10 or more hours, or for 24 hours, at a pressure of from about 20 psig to about 100 psi, for example, at a pressure of 80 psig. In some embodiments, under such conditions, the resin can be observed passing through the graphite plate components within a few hours of achieving the desired internal pressure. In some embodiments, the resin that has passed through the plate can be collected and returned to a pressure pump reservoir. At the end of the desired treatment period, for example, at the end of 24 hours, the electrolytic cell can be depressurized and the graphite plates can be wiped dry and wrapped in wax paper. Thereafter, the impregnated plates, can be placed in an oven between steel plates for a period of from about one to about 10 hours, for example, for 2 hours, at 180° F., followed by from about one to about 20 hours hours, for example, about 10 hours, at 300° F., to set the resin. The steel plates and wax paper together retain the resin within the plates before the resin is set by heat, and the wax paper prevents the impregnated plates from becoming stuck to the steel plates. The graphite plates can then be sanded to remove any surface resin deposits and reassembled. In some embodiments, the thus-assembled electrolytic cell can undergo for pressurization with the resin, again, and the entire process can be repeated one or more times. With very pure, that is, electrolytic grade graphite, the process can produce graphite plates that pass an 80 psig water test.

In the event that it is desired to construct only a single impregnated graphite plate, a method is provided for developing a pressure differential across a porous, monolithic graphite plate in a pressurization container. The pressurization container would have the graphite component placed such that one face side was at atmospheric pressure, while the other side was pressurized at from 20 to 100 psig above atmospheric pressure, with resin, so that the resin is forced through the porous, monolithic plate, from one side to the other side. The impregnated plate can then be heat-treated and set in a manner as described above in connection with impregnating an entire cell. In some embodiments, the impregnation process utilizes pressure in an anisostatic configuration to force the impregnating compound through the plate, in contrast to isostatic treatments where the pressure is the same on all sides of an item contained within a pressure vessel. The anisostatic method is much more effective at providing a thoroughly impregnated graphite plate.

The impregnated or molded, electrolytic grade graphite can be impervious to water diffusion at pressures of, for example, at least about 100 pounds per square inch (PSI). The first electrode plate can include a first surface and the second electrode plate can include a second surface that faces the first surface. The electrode plates can include any one or more of a myriad of shapes, for example, they can be rectangular, circular, square, oval, elliptical, triangular, semicircular, rod-shaped, or any combination thereof. The two opposing electrode surfaces defining the electrolytic reaction zone 114 can include a graphite or graphite material surface. The two opposing surfaces defining the electrolytic reaction zone 114 can include a mixed metal oxide impregnation, or metal material layer that exhibits a low reactivity to the electrolytic solutions. A mixed metal oxide impregnation can give the graphite plates an additional low reactivity to the electrolytic solutions employed during operation of the electrolytic cell. The graphite material can be impregnated with a resin impregnation, a metal oxide impregnation, or a combination thereof.

According to various embodiments, the electrodes in an electrolytic cell can include graphite material impregnated with a hardenable resin, for example, an epoxy resin. The resin can be a phenol-formaldehyde resin, a phenol-furfural resin, a bisphenol epoxy resin, a halogenated bisphenol epoxy resin, a peracteic acid oxidized polyolefin epoxy resin, a methyacrylate resin, an acrylate resin, or any combination thereof. Electrodes manufactured by pressing can use much the same resins in a powdered form. The resins can include, but not be limited to, such resin materials as polyethylene, polypropylene, polyvinyl chloride, polystyrene, and polyvinylidene fluoride. Mixed metal oxides, such as manganese-iron oxides, can be incorporated into the electrodes prior to impregnation by diffusion of appropriate water soluble salts, followed by heating, or mixed directly into the powders prior to pressing of the electrodes when the press method of manufacture is used.

According to various embodiments, an insulating spacer can be disposed between the first surface and the second surface. The first surface can have an outer periphery and the insulating spacer can be flat and include an outer peripheral edge that has a shape that corresponds to the shape of the outer periphery of the first surface. The space bound by the first surface, the spacer, and the opposing second surface when constructed together can define an interior chamber defining, at least in part, an electrolytic reaction zone. The insulating spacer can act as a gasket and spacer for the chamber defined between the two electrode plates. The insulating spacer can be electrically insulating. The insulating spacer can be chemically inert. The insulating spacer can include a material selected from neoprene, fluoroelastomer, vinyl, silicone rubber, a low density polyethylene, or a combination thereof. VITON™ available from Dupont Dow Elastomers of Wilmington, Del. is an example of a fluoroelastomer that can be used as an insulating spacer. The insulating spacer can have a thickness of less than or equal to about one inch, for example, about 0.5 inches, about 0.3 inches, or about 0.25 inches. The insulating spacer can be made without any fabric reinforcement in its composition. The insulating spacer can have an outer periphery larger, smaller, or equal to an outer periphery of the first and/or the second electrode. The insulating spacer can have an inner periphery that is smaller than the smallest outer periphery of the two electrodes.

According to various embodiments, the inlet can be a hole through the first electrode plate, the second electrode plate, or the insulating spacer. The outlet can be a hole through the first electrode plate, the second electrode plate, or the insulating spacer. The inlet hole and the outlet hole can be positioned on opposite sides and opposite corners of the electrolytic reaction zone.

According to various embodiments, a power supply can be electrically connected to the first electrode plate, the second electrode plate, or both plates, of an electrolytic cell. The power supply can be a battery, a direct current (DC) power supply, or an alternating current (AC) power supply. The power supply can be a switchable power supply. The power supply can be used to provide the desired DC to the electrodes. The power supply can be a rectifier power supply operating from typical commercial AC power.

According to various embodiments, the power supply can be capable of maintaining a constant, set current to the electrolytic cell. For example, the power supply can be capable of providing a direct current of from about 0.25 amps per square inch of electrolytic zone electrode surface area (amps/in$^2$) to 1.5 amps/in$^2$, at a voltage of from about one Volt DC to about 24 Volts DC. The voltage can be, for example, from about two Volts DC to about 12 Volts DC, or from about 2.5 Volts DC to about 10 Volts DC, or from about four Volts DC to about eight Volts DC. The power supply can be capable of supplying about one amp hour of power per each molar portion of sodium bromide, sodium chloride, and water, needed to produce from about 1.0 gram to about 1.1 grams of electrolytic bromine measured as chlorine. The power supply can be capable of reversing a polarity of a current supplied to the first electrode plate and the second electrode plate on a cycle of from about one minute to about 1440 minutes per cycle.

According to various embodiments, the cross-section of an electrolytic solution stream flowing through the electrolytic reaction zone can be rectangular in shape, square in shape, oval or elliptical in shape, for example. The electrolytic zone electrode surface area can be the combined surface area of the first surface of the first electrode plate and the second surface area of the second electrode plate, for example, to the extent those surfaces can contact an electrolytic solution flowing through the electrolytic reaction zone. The electrolytic reaction zone electrode surface area can be the sum of the first electrode surface area and the opposing second electrode surface area to the extent those surface areas are not in contact with the insulating spacer According to various embodiments, the electrolytic solution system can include a positive displacement pump. The pump can have an adjustable flow rate, for example, via a variation in a pump stroke, via a variation in a speed.

The electrolytic solution system can include a pressurized water supply wherein the pressurized water supply is capable of maintaining a constant, set-flow of pressurized water supply. The pressurized water supply can include a pressure regulator, a flow regulator, and a water supply. The electrolytic solution system can include an in-line mixer. The electrolytic solution system can include a mixture supply system including a mixture supply outlet. The electrolytic solution system can maintain a pressure internal to the electrolytic reaction zone. A flow rate can be maintained by the electrolytic solution system at a pressure that can be, for example, a rate of up to about 100 PSI, for example, up to about 25 PSI, up to about 50 PSI, up to about 75 PSI, up to about 100 PSI, or up to about 200 PSI or greater.

In an exemplary system, the electrolytic solution system can include a pump, a mixture system with a mixture supply outlet, a pressurized dilution water supply including a pressurized water supply outlet, a water supply, an in-line static mixer to combine the supply from the mixture supply outlet, the pressurized water supply outlet, or a combination thereof. The electrolytic solution system can form a diluted electrolytic solution.

According to various embodiments, the mixture system can include a first pump having a first pump outlet in fluid communication with a supply that can include a sodium bromide solution, for example, a 40% by weight aqueous solution of sodium bromide in water referenced as PCT 3038, also available from ProChemTech International, Inc., Brockway, Pennsylvania, and a second pump having a second pump outlet in fluid communication with a supply that can include a sodium chloride solution, for example, 22.7% by weight aqueous solution of sodium chloride in water referenced as PCT 3039, also available from ProChemTech International, Inc.

The mixture supply system can provide a supply of sodium bromide that can include, for example, from about 35% by weight to about 45% by weight sodium bromide solution, and a supply of sodium chloride solution that can include, for example, from about 20% by weight to about 25% by weight sodium chloride solution. The mixture supply system can provide a supply with a mixture ratio of the sodium bromide solution and the sodium chloride solution, to the metered water supply of from about 1:10 to about 1:30. The mixture system can include a single solution supply system with an appropriate mixture ratio of sodium chloride and sodium bromide, such as PCT 3024, an aqueous solution of 14.9% sodium bromide and 17.0% sodium chloride in water, also available from ProChemTech International, Inc. The mixture system can provide any solution capable of an electrolytic reaction using any number of solution supplies.

According to various embodiments, an electrolytic cell can include at least two electrodes. The electrolytic cell can include two electrodes, with a first electrode capable of performing as an anode and the other of two electrodes performing as a cathode. The electrolytic cell can include more than two electrodes, with the first electrode capable of operating as an anode, the second electrode capable of operating as a cathode, and any and all additional electrodes acting as bi-polar electrodes.

Figure 2:
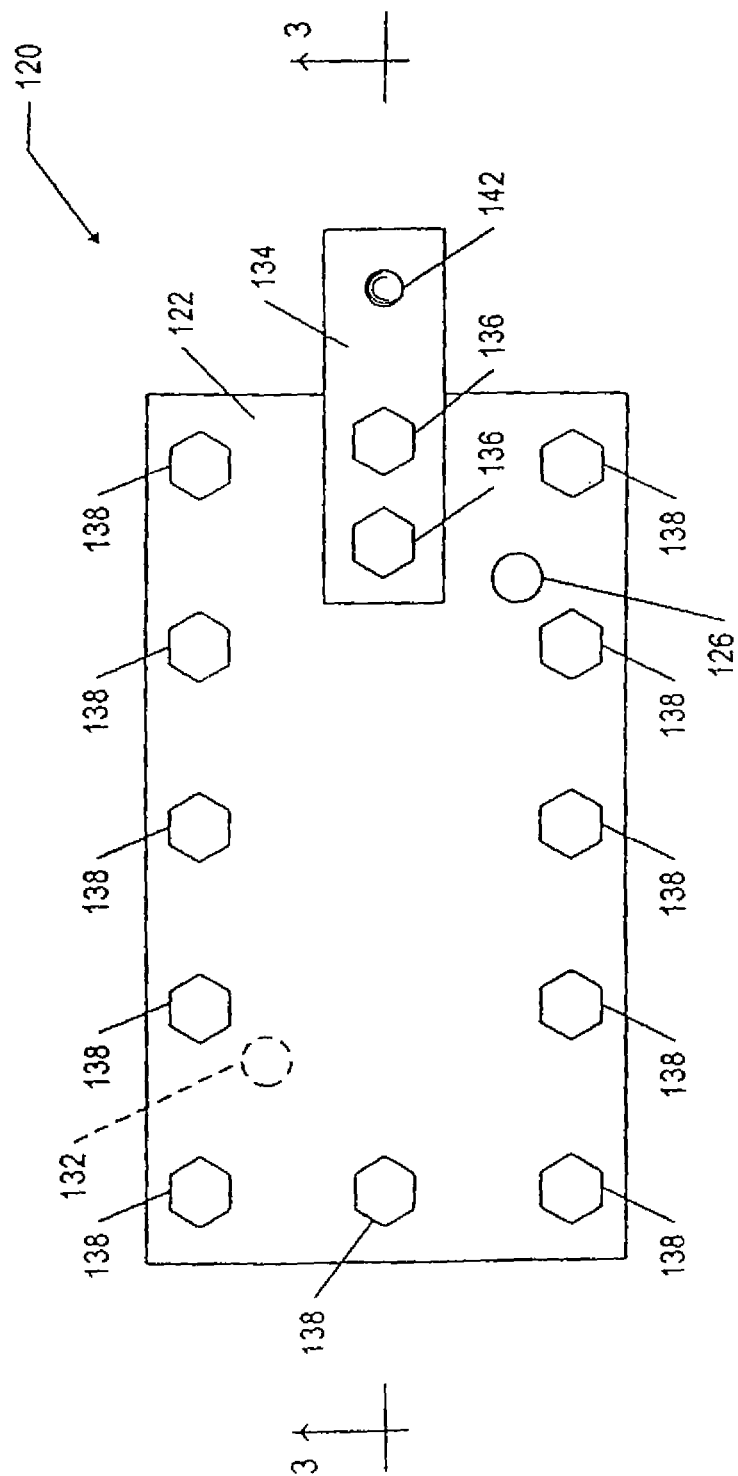
FIG. 2 is a side view of the electrolytic cell shown in FIG. 1.

FIG. 2 is a top view of an exemplary embodiment of an electrolytic cell 120. The electrolytic cell 120 can include a first electrode plate 122, an insulating spacer 130 (shown in phantom), and a second electrode plate (not shown) joined together using a first set of bolts 138 to sandwich the insulating spacer between the first electrode plate 122 and the second electrode plate. The first set of bolts 138 can be electrically insulating. The first set of bolts 138 can include nylon bolts, plastic bolts, metal bolts used with insulating sleeves and washers, metal bolts insulated using rubber, or a combination thereof. Nylon, other plastic, or metal nuts can be used. The first set of bolts 138 can be chemically inert. Buss bar 134 can be connected to the first electrode plate 122 using a second set of bolts 136. A second buss bar (not shown) can be connected to the second electrode plate. Buss bar 134 and the second buss bar can be used to provide electrical power to electrolytic cell 120. The buss bar 134 can include an electrically conductive metal and the second set of bolts 136 can be electrically conductive, for example, made of stainless steel, copper, iron, or the like. An inlet 126 can be disposed in the first electrode plate 122 and an outlet 132 (shown in phantom) can be disposed in the second electrode plate. The inlet 126 and outlet 132 can includes extensions threaded to or otherwise connected to the first electrode plate and the second electrode plate, respectively. The electrode plates can each have two opposite, parallel, planar sides, or parallel, or planar surfaces. A hole 142 can be provided to connect the cell 120 to a power supply (not shown). The hole 142 can be threaded.

Figure 3:
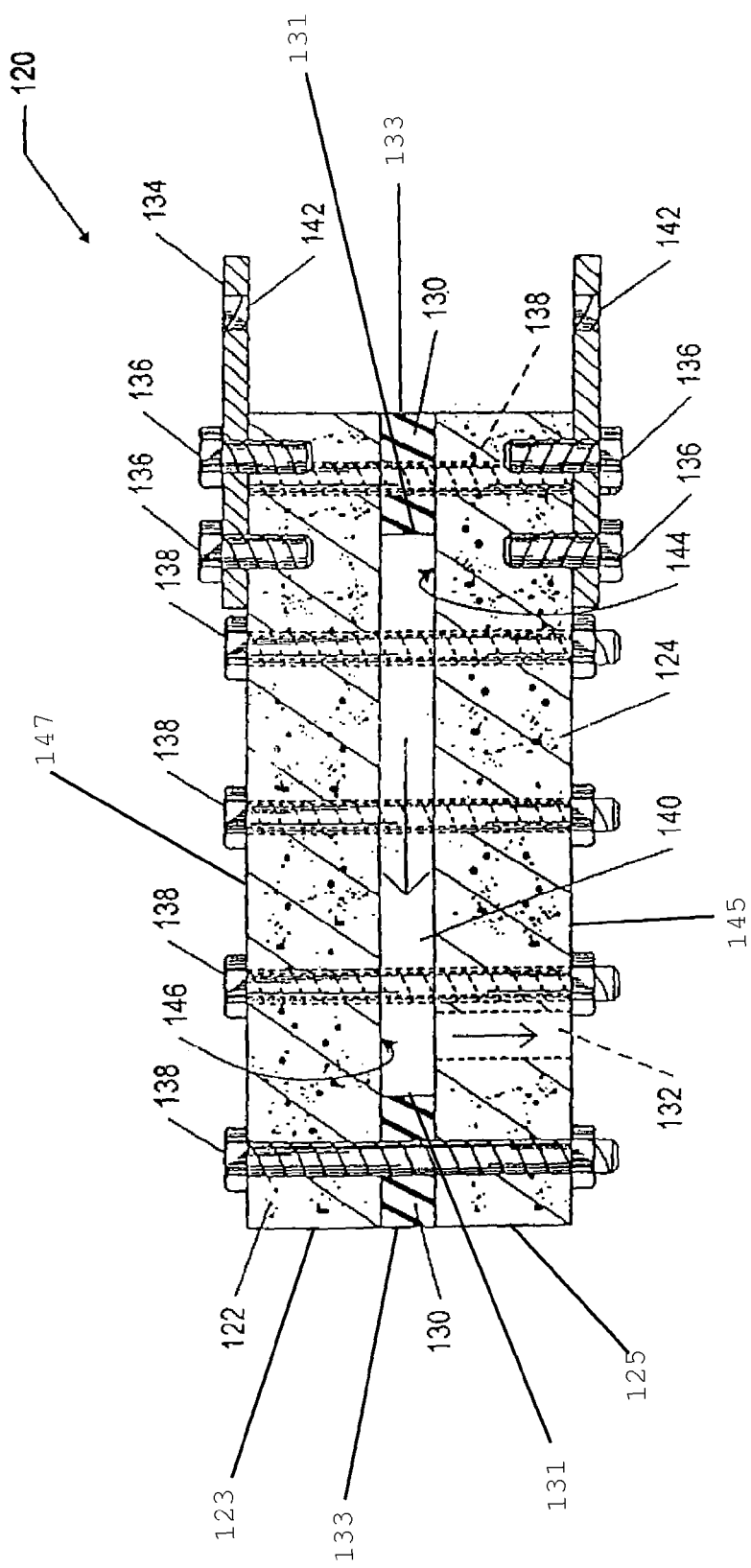
FIG. 3 is a top cross-sectional view in partial phantom, of the electrolytic cell of FIG. 2.

FIG. 3 is a side cross-sectional view of the electrolytic cell 120 taken along line 3-3 of FIG. 2. Depicted in FIG. 3 is an insulating spacer 130 having an inside peripheral edge 131 and an outside peripheral edge 133. Inside peripheral edge 131 in-part defines the electrolytic reaction chamber 140 for an electrolytic solution or fluid flowing through the electrolytic cell 120. A first unmarked arrow in chamber 140 and a second unmarked arrow in the outlet 132 depict the direction of the electrolytic solution flow. The second electrode plate 124 is visible in FIG. 3. The cross-sections of the first set of bolts 138 are depicted in FIG. 3. The cross-sections of the second set of bolts 136 can be seen in FIG. 3. A first surface 146 of first electrode plate 122 and a first surface 144 of second electrode plate 124 can at least in-part define an electrolytic reaction zone electrode surface area. First electrode plate 122 also has a second surface 147 and second electrode plate 124 also has a second surface 145. The inlet is not shown in FIG. 3. The first electrode 122, buss bar 134, and threaded hole 142 are also depicted in FIG. 3.

The scale of various parts of the apparatus depicted in FIGS. 1-3 does not necessarily represent required or desired dimensions of an electrolytic cell.

Electrolytic cells can be designed for outputs of from about 0.25 lbs/day to about 500 lbs/day, for example, about one lb/day, about five lbs/day, about 10 lbs/day, about 20 lbs/day, about 100 lbs/day, or about 500 lbs/day of electrolytic bromine measured as free chlorine. Exemplary design parameters for an electrolytic cell to produce 5 lbs/day of electrolytic bromine measured as free chlorine can be:

Plate spacing—about 0.25 inches
Plate area—about 81 square inches
Operating voltage—about 9 to 10 VDC
Required amperage—about 86 Amps
Salt feedrates—about 0.24 gallons per hour (GPH)
Dilution water feedrate—about 6.3 GPH The apparatus can include an electrolytic cell, a DC power supply, an in-line mixer for mixing electrolytes with dilution water, appropriate metering pumps for the electrolytes, a dilution water flow controller, and a system control panel.

Figure 4:
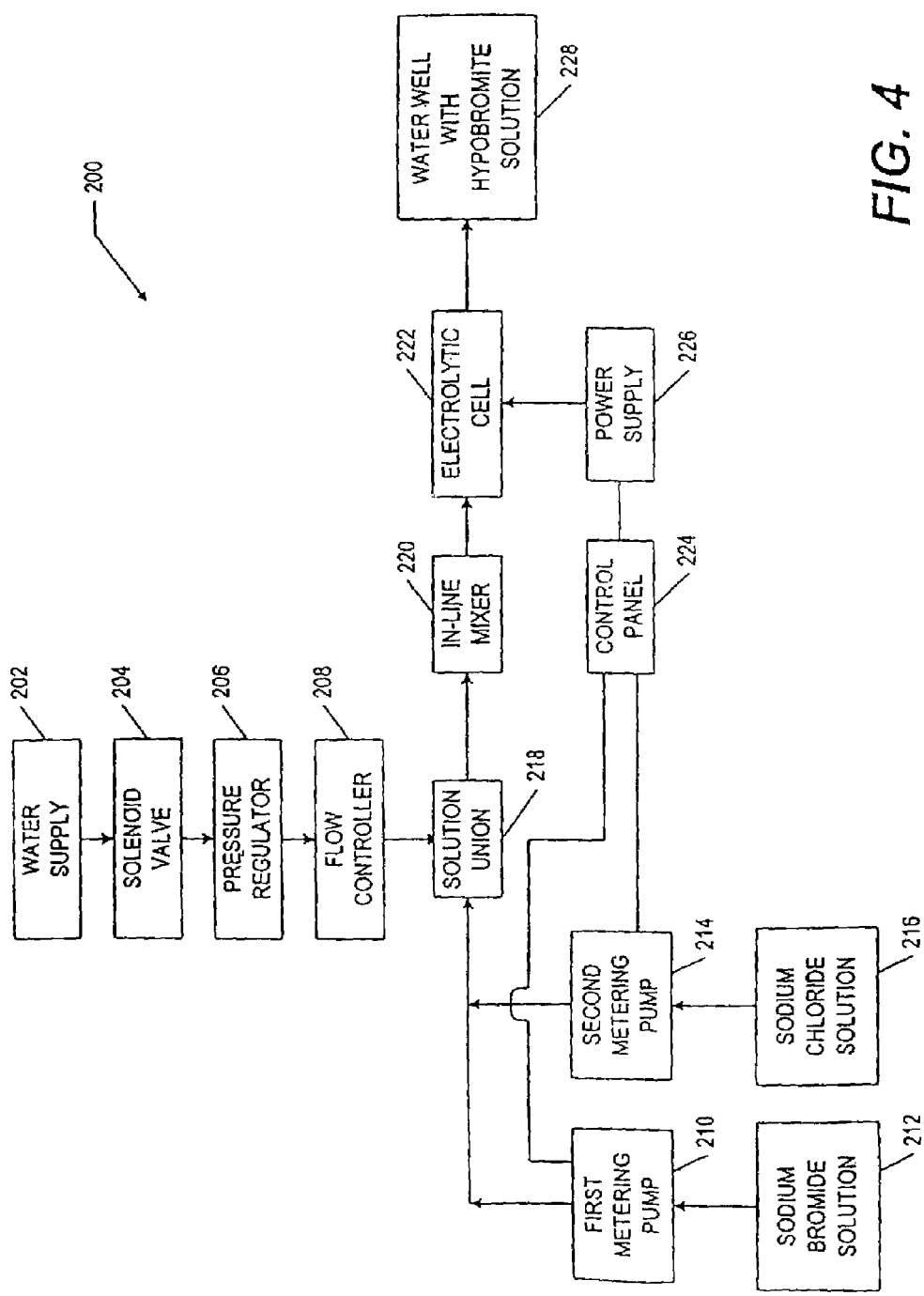
FIG. 4 is a flow diagram of an electrolytic electrolytic bromine generation process.

FIG. 4 is a process flow diagram for an electrolytic electrolytic bromine system 200. A pressurized source of water, such as water supply 202, can be controlled using a solenoid valve 204 in fluid communication with a pressure regulator 206 and a flow controller 208. A plurality of chemical pumps, shown in FIG. 4 as a first metering pump 210 and a second metering pump 214, can supply a plurality of chemicals needed for the electrolytic process. Sodium bromide solution 212 and sodium chloride solution 216, for example, can be fluidly connected to the first metering pump 210 and the second metering pump 214, respectively. Sodium bromide solution 212 and sodium chloride solution 216 can be mixed with water from the flow controller 208 using a solution union 218, for example, a T-junction. An in-line mixer 220 can be used to obtain a uniform mix of solutions downstream of the solution union 218. The uniform mix can be processed by an electrolytic cell 222. A control panel 224 can be used to control the first metering pump 210, the second metering pump 214, and a power supply 226. The power supply 226 can be electrically connected to the electrolytic cell 222. Fluid output from the electrolytic cell 222 can flow into a water well 228. The water well 228 can receive a electrolytic bromine solution as shown in FIG. 4. The composition of the solution flowing from the electrolytic cell 222 to the water well 228 can be different if the sodium bromide solution 212 and the sodium chloride solution 216 are replaced by other chemicals. The water well 228 can be used with a gas separator (not shown) to vent a gas resulting from the electrolytic reaction, for example, Hydrogen gas ($H_2$). The water well 228 can be, for example, a cooling tower, a water supply system, a reservoir, or the like.

Figure 5:
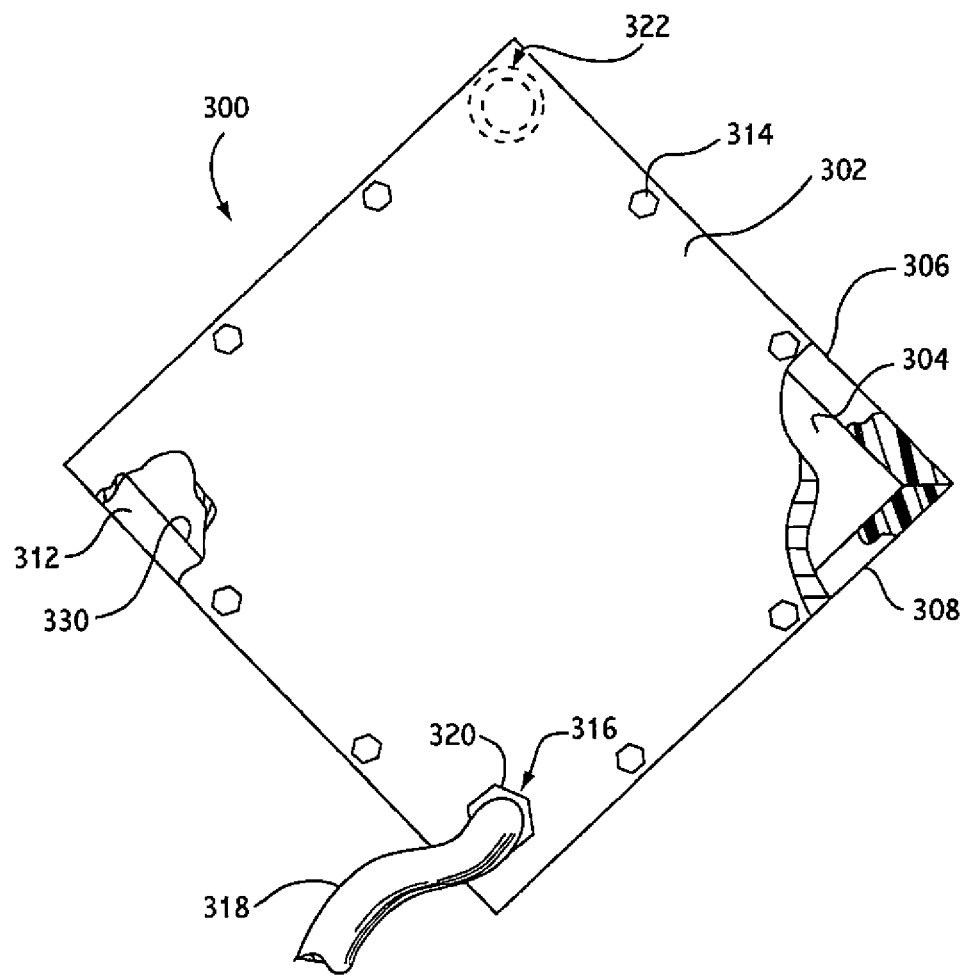
FIG. 5 is a front view in partial cutaway of a containerless electrolytic cell according to various embodiments of the present teachings and comprising electrodes each made of a porous, monolithic graphite plate that has been impregnated with resin by a flow-through impregnation technique.
Figure 6:
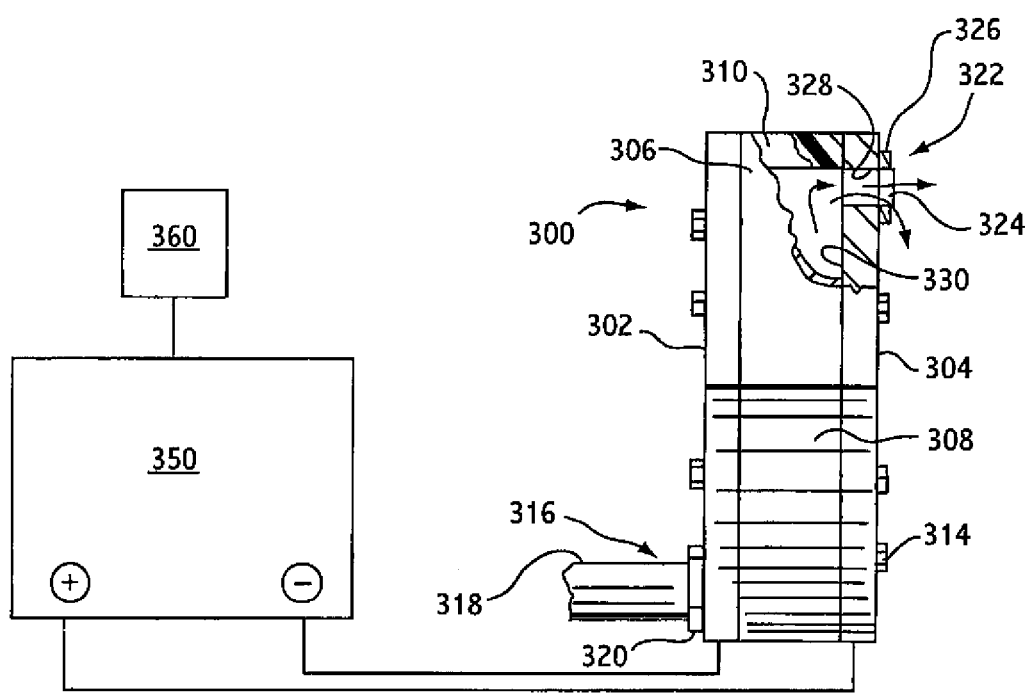
FIG. 6 is a side view in partial cutaway of the containerless electrolytic cell of FIG. 5 and showing a power source connected thereto.

FIG. 5 is a side view, in partial cutaway, of an electrolytic cell 300 according to various embodiments of the present teachings. FIG. 6 is a side view of electrolytic cell 30 from FIG. 5, shown in partial cutaway, and depicting electrolytic cell 300 connected to a power source 350. As shown in FIGS. 5 and 6, electrolytic cell 300 comprises a first electrode 302 and a second electrode 304 which are spaced apart from one another by insulating walls 306, 308, 310, and 312. The inner surfaces of electrodes 302 and 304, and of insulating walls 306, 308, 310, and 312 together define an interior cavity 330 in which electrochemical and/or electrolytic reactions can take place.

Electrodes 302 and 304 can be secured to insulating walls 306, 308, 310, and 312, with a plurality of bolts 314, although any suitable fastener can be used to hold electrolytic cell 300 together.

As shown in FIGS. 5 and 6, electrolytic cell 300 is provided with an inlet 316 that comprises a coupling 320 for coupling inlet 316 to an inlet supply conduit 318. An outlet 322 is provided with a coupling 326 to connect a spout 324 to outlet 322. As shown, outlet 322 can comprise a through-hole 328 through electrode 304. Although not shown, inlet 316 can comprise a through-hole through electrode 302.

FIGS. 5 and 6 depict electrolytic cell 300 in an operational orientation wherein outlet 322 is located at the top of electrolytic cell 300 and inlet 316 is located at the bottom of electrolytic cell 300. In the embodiment shown, electrolytic cell 300 comprises four corner edges and outlet 322 is located adjacent the top corner edge while inlet 316 is located adjacent the bottom corner edge. A control unit 360 can be provided to control power source 350 and optional also control the flow of fluid through electrolytic cell 300.

By constructing the electrolytic cell from square plates and mounting the cell so that one right angle forms the top of the cell, an improved cell design is achieved. Aqueous sodium bromide-chloride solution can be introduced at the right angle forming the bottom of the cell, and the electrolytic bromine solution produced can be removed at the top right angle of the cell. The life of such an electrolytic cell can be increased substantially for the following two reasons. For one, the square cell design and orientation eliminates gas accumulation within the electrolytic cell. Additionally, the square cell design and noted mounting/orientation eliminates bromine accumulation in the cell due to the mixing resulting from the bottom inlet.

The electrodes, insulating walls, inlet, outlet, and bolts depicted in FIGS. 5 and 6 can comprise the materials, shapes, designs, and properties of those elements described herein, for example, with reference to the embodiment depicted in FIGS. 1-3.

According to various embodiments of the present methods, electrolytic cell 300 can be assembled as shown in FIGS. 5 and 6 but wherein electrodes 302 and 304 comprise porous, monolithic graphite plates that have not yet been impregnated. After construction of electrolytic cell 300 according to such embodiments, a pressurized supply of flowable, hardenable resin can be supplied through conduit 318 and inlet 316, and into interior cavity 330. In some embodiments, outlet 322 can be closed-off, for example, with a cap, stopper, or other sealing member, such that residual gas and/or flowable, hardenable resin cannot escape interior cavity 330 thorough outlet 322. In some embodiments, insulating walls 306, 308, 310, and 312 of electrolytic cell 300 can comprise non-porous insulating material that, like outlet 322, can exhibit properties that prevent the flow of residual gas and/or flowable, hardenable resin therethrough. In such embodiments, the pressurized supply of flowable, hardenable resin can be forced from interior cavity 330 through the pores of the porous monolithic graphite electrodes 302 and 304 so as to completely impregnate porous, monolithic graphite plates 302 and 304 with the flowable, hardenable resin. In some embodiments, pressure treatment with the flowable, hardenable resin can continue until the flowable, hardenable resin impregnates completely through electrode plates 302 and 304 and seeps out of the outside surfaces of electrodes 302 and 304. Impregnating pressures to force the flowable, hardenable resin into and through the monolithic graphite plate can comprise pressures of 5 psig or more, 10 psig or more, 20 psig or more, 30 psig or more, or 50 psig or more, depending primarily on the porosity of the plates and viscosity of the resin.

After impregnation with the flowable, hardenable resin, interior cavity 330 can be cleared of the flowable, hardenable resin and the impregnated electrolytic cell thus prepared can be cured, for example, so that the flowable, hardenable resin hardens and an electrolytic cell comprising resin-impregnated monolithic graphite electrode plates is produced.

In some embodiments, hardening the flowable, hardenable resin can comprise heating the resin-impregnated monolithic graphite electrode plates, cooling the resin-impregnated monolithic graphite electrode plates, exposing the resin-impregnated monolithic graphite electrode plates to moisture, allowing the resin-impregnated monolithic graphite electrode plates to set for a period of time, or a combination thereof. After hardening, electrolytic cell 300 is ready for operation.

Figure 7:
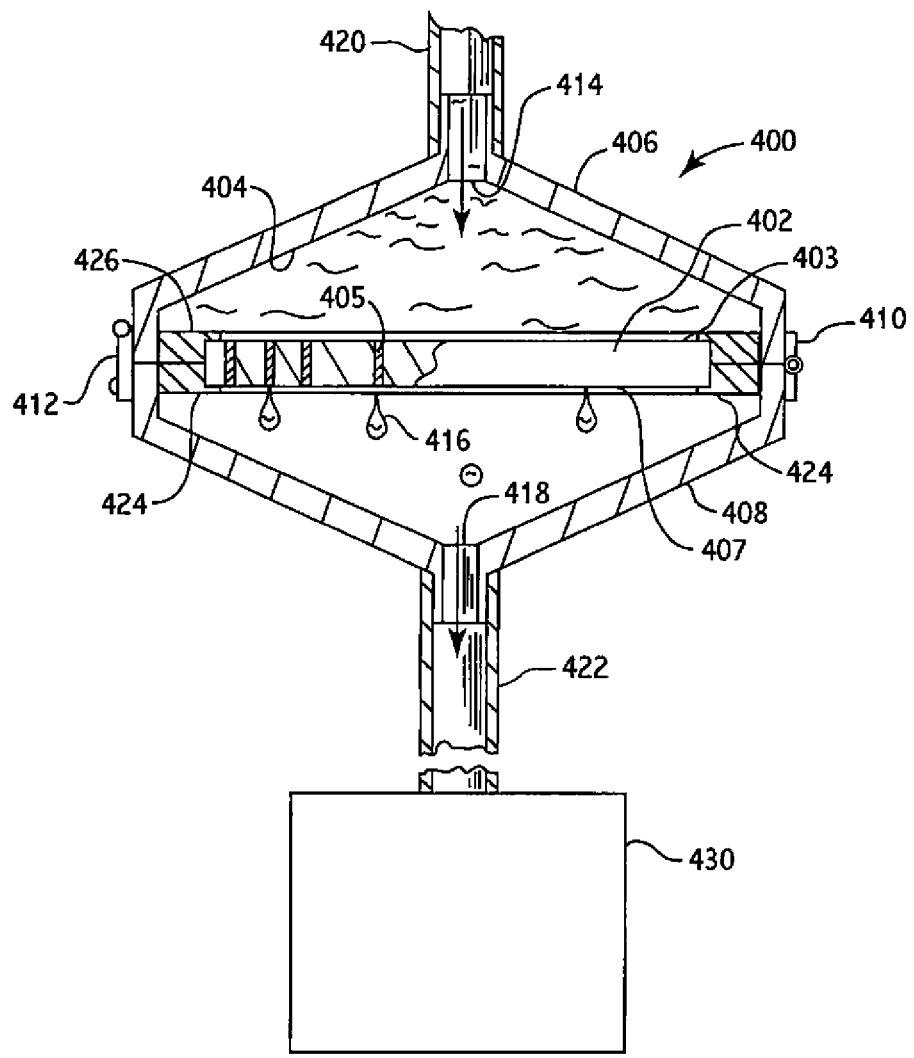
FIG. 7 is a device for flow-through impregnating a porous, monolithic graphite electrode plate with a resin.

According to various embodiments of the present teachings, electrodes 302 and 304 shown in FIGS. 5 and 6 can be resin-impregnated by a flow-through impregnation technique carried out to form the electrodes before electrolytic cell 300 is assembled. FIG. 7 shows a device and method for flow-through-resin-impregnating a porous, monolithic graphite plate prior to assembling the impregnated plate as a component of an electrolytic cell. As shown in FIG. 7, an impregnation device 400 is provided to impregnate a porous-monolithic graphite plate 402, for example, comprising electrolytic grade graphite, that is, graphite that is at least 99.99% pure. The graphite of electrode plate 302 can comprise high density graphite, that is, having a density of at least about 1.80 gram/cubic centimeter, for example, a density of 1.85 to 1.88 gram/cubic centimeter. Exemplary high density graphite can comprise isostatically pressed graphite. In some embodiments, isostatically pressed graphite can be used which eliminates any directional porosity in, or density differences throughout, the pressed component or plate. High density graphite having a density of from about 1.85 to about 1.88 grams/cubic centimeter is commercially available, for example, as grade 2124 from Carbone Lorraine and as grade R 6710 from SGL Carbon, both of St. Marys, Pa. The higher the density of the graphite, the less resin is present in the impregnated component. In view of the fact that the graphite is substantially more chemically resistant than the resin, higher density graphite is used to produce a superior cell component.

Porous, monolithic graphite plate 402 can be secured in an interior cavity 404 of impregnation device 400 by lower and upper clamping devices 424 and 426, respectively. Clamping devices 424 and 426 can be mounted along the inner periphery of lower device half 408 and upper device half 406, respectively, as shown. Device halves 406 and 408 do not necessarily have to be mirror images of one another and, although referred to as halves, can independently constitute more than 50% of the volume of interior cavity 404.

Upper device half 406 and lower device half 408 can be hingedly fastened together by a hinge 410 and can be locked together by a lock 412 as shown. Porous, monolithic graphite plate 402 can be secured between clamping devices 424 and 426 along peripheral edges of porous monolithic electrode plate 402. Clamping devices 424 and 426 can be secured to the inner side walls of the respective device halves 408 and 406, respectively, and can comprise a material that is at least slightly elastic, elastomeric, and/or ductile, such that when device half 406 and device half 408 are locked together with a porous, monolithic graphite plate held by clamping devices 424 and 426, and air-tight arrangement is provided such that gas and liquid can only flow from the space above porous, monolithic graphite plate 402 to the space below porous, monolithic graphite plate 402, through the pores of porous, monolithic graphite plate 402.

As shown in FIG. 7, impregnation device 400 is provided with an inlet 414 to interior cavity 404, through which a flowable, hardenable resin material 416 can enter interior cavity 404 and fill the space above porous, monolithic graphite plate 402. By causing a pressure differential across porous, monolithic graphite plate 402, as for example, by pulling a vacuum through an outlet 418 of impregnation device 400, the flowable, hardenable resin material 416 can be made to penetrate a top surface 403 of porous, monolithic graphite plate 402, enter and pass through pores 405 in porous, monolithic graphite plate 402, and exit pores 405 through a bottom surface 407 of porous, monolithic graphite plate 402. Vacuum through outlet 418 can be provided by a vacuum source 430 in fluid communication with outlet 418 through a conduit 422. Flowable, hardenable resin can be provided through inlet 414 by a resin supply (not shown) in fluid communication with inlet 414 through a conduit 420. In some embodiments, resin collected by vacuum source 430 can be recirculated (not shown) through conduit 420 and inlet 414. Although a pressurized supply of resin and a vacuum source are described, it is to be understood that a pressurized source of flowable, hardenable resin can be used without a vacuum source, or a vacuum source can be used without a pressurized source of flowable, hardenable resin, provided a pressure differential is created between top surface 403 and bottom surface 407 of porous, monolithic graphite plate 402, that is sufficient to push or pull the resin through porous, monolithic graphite plate 402. The porous, monolithic graphite plate to be made into the resin-impregnated electrode can be made by isostatically pressing a mixture of isotropic petroleum coke, size range mixture running from 1 to 75 micron, and coal tar pitch at a pressure of about 10,000 psig, or greater, in a rubber mould using a hydraulic isostatic press. The green compact thus produced is then sintered and carbonized by heating in a furnace for 1 day to 20 days at temperatures increasing from 600 C to 1200 C to form a carbon compact. To fill the voids in the carbon compact, it is impregnated with either coal tar pitch, or phenolic resin, via vacuum/pressure impregnation and recarbonized by another cycle of heating in the furnace. The cycle of impregnation followed by furnace heating is repeated several times to obtain the highest possible density carbon compact prior to graphitization. The high density carbon compact is then graphitized by heating in a furnace for 1 to 20 days at a temperature range of 3000 to 3500 C to convert the carbon compact to the high density, isostatic pressed, electrolytic graphite desired as a starting material for manufacture of resin impregnated electrodes.

According to various embodiments, during operation of the cell, the method can include setting a flow rate of the electrolytic solution stream to obtain a conversion efficiency of bromide to electrolytic bromine ion, of about 85% or greater. The flow rate of the stream can be set to control the cell to produce from about 0.5 gram to about 1.5 grams of electrolytic bromine (measured as chlorine) for each amp hour of power provided.

According to various embodiments, the sodium bromide can include a sodium bromide solution, and the sodium chloride can include a sodium chloride solution. In an exemplary system, the sodium bromide solution can include from about 35% by weight to about 45% by weight sodium bromide, and the sodium chloride solution can include from about 20% by weight to about 25% by weight sodium chloride. The electrolytic solution can have a mixture ratio of the sodium bromide solution and the sodium chloride solution, to water, of from about 1:10 to about 1:30.

According to various embodiments, the electrolytic solution stream can be pumped to maintain a pressure of at least about 25 psig, for example, at least about 50 psig or at least about 100 psig in the electrolytic cell.

According to various embodiments, the electrolytic solution stream can include a sodium bromide and sodium chloride solution that can include from about 17.3% by weight to about 27.3% by weight sodium bromide, and from about 7.7% by weight to about 17.7% by weight sodium chloride, with the balance being water.

According to various embodiments, a system is provided that can include an electrolytic cell, a control panel, a power unit, two feed pumps, and an in-line mixer. An integral internal timer, possibly in the control panel, can control operation of the system for slug feed applications. The timer can be used to turn the system on and off. With this system, the electrolytic bromine solution can be directly discharged into a cooling tower basin so as to vent off the hydrogen gas produced by the electrolytic cell.

According to various embodiments, a system is provided that can include an electrolytic cell, a control panel, a power unit, two feed pumps, an in-line mixer, a vented electrolytic bromine storage tank with a level sensor, and a transfer pump drawing from the vented storage tank. An integral timer, in the control panel, can control operation of the transfer pump to discharge electrolytic bromine solution on an on-off basis. The discharge can be into highly pressurized lines, into areas that do not provide appropriate venting for produced hydrogen gas. The discharge can be in greater slug dose amounts than can be provided by direct operation of the electrolytic cell, depending on treatment circumstances, by appropriate provisioning of such immediate amounts of electrolytic bromine solution. Operation of the electrolytic cell can be automatically controlled by the level sensor in the vented tank. The level sensor can be utilized to maintain the vented tank in a "full" condition. Hydrogen gas produced by the electrolytic cell can be vented from the storage tank.

According to various embodiments, the system can include one or more of a Hach chlorine analyzer control, an Oxidation Reduction Potential (ORP) analyzer control, an electrolytic cell, a control panel, a power unit, two feed pumps, an in-line mixer, a vented electrolytic bromine solution storage tank, a level sensor for the vented electrolytic bromine solution storage tank, and a variable speed pump drawing from the vented tank. A electrolytic bromine detector can be included, for example, a Hach chlorine analyzer, or an ORP analyzer. The detector can be capable of detecting electrolytic bromine in a treated solution, such as cooling tower water, wherein the electrolytic bromine detector can generate an output signal. The output signal can be utilized to vary the variable speed pump output in proportion to the signal received. The output signal can be utilized to maintain a preset or user-defined concentration of electrolytic bromine in the water contacting the electrolytic bromine detector. The vented electrolytic bromine solution storage tank level sensor can control the operation of the electrolytic cell maintaining the tank in a "full" condition. Hydrogen gas in the storage tank can be vented.

According to various embodiments, the system and the various control systems therein can be utilized to maintain a electrolytic bromine residual level as bromine in the treated water of from about 0.2 mg/l to about 5.0 mg/l. The electrolytic bromine residual level can be measured one hour after a slug feed. The electrolytic bromine residual level can be measured on a continuous basis. The electrolytic bromine residual level can be measured for effective biocidal control. Dependent upon specific treated water variables, higher levels, such as 1.0 mg/l to 15.0 mg/l may be desired, or required, to be effective for biocidal control.

Any appropriate range DPD-based bromine or chlorine test kit can be used for control purposes using, for example, material testing. The conversion factor from chlorine to bromine is 2.25.

According to various embodiments, the method can include making two equimolar aqueous solutions of sodium bromide and sodium chloride, and feeding these solutions in exact portions, with sufficient dilution water, into an electrolytic apparatus. Within the electrolytic apparatus, application of a controlled voltage DC current can convert a bromide ion to a electrolytic bromine ion at an efficiency that of about 95% or greater.

The teachings described herein can be based upon the following electrolysis reactions:
1. $4H_2O+4e-=4OH-+2H_2$
2. $2Cl-=Cl_2+2e-$
3. $2OH-+Cl_2=ClO-+Cl-+H_2O$
4. $ClO-+Br-=BrO-+Cl-$
5. $2Br-=Br_2+2e-$ (bromine)
6. $Br_2+H_2O=HOBr+Br-$ (hypobromous acid)
7. $2OH-+Br_2=BrO-+Br-$ (hypobromite)
8. $Cl-$ and $Br-$ from the right hand side of reactions 3, 4, 6, and 7 can recycle back to reactions 2 and 5 respectively, to drive the conversion to about 85% or greater efficiency as to the conversion of $Br-$ to electrolytic bromine, a mixture of bromine, hypobromous acid, and hypobromite. Reaction 4 can be a replacement reaction that goes to completion without application of any electromotive force.

According to various embodiments, the method can be modified as desired for adjusting, for example, the amount of electrolytic bromine in the outgoing solution, the molar balance of chloride to bromide ion in the salt solutions, the conductivity of the diluted salt solution, the relationship of voltage to electrode plate spacing, and the required amperage-time relationship.

According to various embodiments, methods are provided that include the processing of two equimolar solutions of sodium bromide and sodium chloride. The two solutions can be mixed together to generate 14.9% by weight sodium bromide and 17.0% by weight sodium chloride, dissolved in water. These solutions or mixed solution can then be fed at a controlled rate into the electrolytic apparatus with sufficient dilution water so as to obtain about a 1:27.7 dilution of the salt water. Within the electrolytic apparatus, application of DC current to such a solution can produce from about 1.0 gram to about 1.1 grams of electrolytic bromine measured as free chlorine for each amp-hour of power applied. This can result in production of a mixture of elemental bromine, hypobromous acid, and electrolytic bromine. This mixed bromine and bromine compound product is referred to herein as "electrolytic bromine," and can have a bromine concentration, measured as total bromine, of approximately 0.3 to 2.0%. A process flow diagram of the process is depicted in FIG. 4.

According to various embodiments, methods are provided that include the use of two electrodes and an insulating plate. According to various embodiments, the electrodes used can each include a titanium plate including a platinum coating having a thickness of from about 200 to about 300 mils (1/1000 of an inch, or about 0.2 inches to about 0.3 inches).

While specific materials are mentioned above, the construction of the electrolytic cell electrodes can include resin-containing graphite, titanium electrodes plated with 200 to 300 mils of platinum, or the like. The methods can include the use of any these electrode types and can be modified as desired by adjustments to one or more of: the spacing of the plates; the plate area; the voltage and amperage of the power supply; and the feed rates for the salt solutions and water.

The methods and apparatus taught herein can be used in large industrial and commercial cooling systems, for example, over 200 tons. The system can produce a solution of sodium electrolytic bromine on demand that is very effective for control of algae, bacteria, and fungi in cooling systems.

In comparison to current technology, the methods, apparatus, and the electrolytic bromine product produced according to the teachings herein can offer multiple specific advantages.

In the area of health and safety, the reagents can be pH neutral, inert, stable, salt water solutions that can be totally non-hazardous. For reactivity, the chemical reactivity of the freshly produced electrolytic bromine can be very high, resulting in a quick kill of target organisms. The product can be produced "on demand" and has no problems with loss of activity in storage.

Electrolytic bromine produced by the apparatus and methods taught herein can include a very low chlorine and hypochlorite content, in contrast to products such as hydantoin where 50% of the halogen content is chlorine. This property can make the produced electrolytic bromine less aggressive to scale and corrosion inhibitors, and can make the electrolytic bromine more compatible. Produced electrolytic bromine can stay more active longer in a cooling tower.

The produced electrolytic bromine can penetrate and remove biofilms better than chlorine based biocides. The electrolytic bromine can be more effective at high pH values than chlorine based biocides. The produced electrolytic bromine can be more cost effective than any non-oxidizing biocide and most competing oxidizers. The produced electrolytic bromine reacts with fewer organics, and in smaller amounts, than chlorine based products, thus forming fewer and lesser amounts of undesirable byproducts, such as, AOX and THM, "halogenated organics." Thus, the produced electrolytic bromine can be more environment friendly.

Electrolytic cells constructed by the teachings in this disclosure can substantially reduce construction costs. The cost of resin or metal-oxide impregnated electrodes, either molded or pressed, can be substantially less than electrodes constructed of typical materials, such as platinum plated titanium. The use of the resin impregnated graphite permits construction of the electrolytic cell such that the electrodes can become the electrolytic solution container. This can substantially lower the cost of the electrolytic cell.

The present teachings relate to other embodiments of the methods and apparatus disclosed herein. Embodiments apparent to those skilled in the art from consideration of the present teachings and their practice of the present teachings are included herein. It is intended that the present specification and examples be considered as exemplary only with a true scope and spirit of the teachings being indicated by the following claims and equivalents thereof.

What is claimed is:

1. A method of forming a resin-impregnated monolithic graphite electrode, comprising:
    providing a first porous, monolithic plate comprising graphite and having a first surface, an opposite second surface, and an outer peripheral edge;
    contacting the first surface with a supply of a flowable, hardenable resin;
    causing a pressure differential across the first porous, monolithic plate such that the first surface is exposed to a first pressure, the second surface is exposed to a second pressure, and the first pressure is greater than the second pressure;
    causing the flowable, hardenable resin to flow through the first porous, monolithic plate from the first surface to the second surface to impregnate the first porous, monolithic plate and form a first impregnated monolithic plate;
    hardening the flowable, hardenable resin in the first impregnated monolithic plate, to form a first resin-impregnated monolithic graphite electrode;
    providing a second porous, monolithic plate comprising graphite and having a first surface, an opposite second surface, and an outer peripheral edge;
    providing an insulating spacer having an outside peripheral edge and an inside peripheral edge;
    constructing an electrolytic cell comprising an inlet and an outlet, the electrolytic cell comprising the first and second porous, monolithic plates spaced apart from one another by sandwiching the insulating spacer between the first surface of the first porous, monolithic plate and the first surface of the second porous, monolithic plate, such that the electrolytic cell has an interior cavity defined by the first surfaces of the first and second porous, monolithic plates and the inside peripheral edge of the insulating spacer, the interior cavity comprising an electrolytic reaction zone;
    contacting the first surface of the second porous, monolithic plate with a supply of a flowable, hardenable resin;
    causing a pressure differential across the second porous, monolithic plate such that the first surface of the second porous, monolithic plate is exposed to a first pressure, the second surface of the second porous, monolithic plate is exposed to a second pressure, and the first pressure is greater than the second pressure;
    causing the flowable, hardenable resin to flow through the second porous, monolithic plate from the first surface to the second surface to impregnate the second porous, monolithic plate and form a second impregnated monolithic plate; and
    hardening the flowable, hardenable resin in the second impregnated monolithic plate, to form a second resin-impregnated monolithic graphite electrode;
    wherein the contacting the first surfaces of the first and second porous, monolithic plates comprises filling the interior cavity of the electrolytic cell with the flowable, hardenable resin, under pressure.

2. A resin-impregnated electrode comprising the first resin-impregnated monolithic graphite electrode produced by the method of claim 1.

3. The method of claim 1, wherein the second pressure comprises atmospheric pressure and the first pressure comprises 20 to 100 psig above atmospheric pressure.

4. The method of claim 1, wherein the filling the interior cavity of the electrolytic cell with the flowable, hardenable resin, under pressure comprises filling the interior cavity of the electrolytic cell with the flowable, hardenable resin for about 1 hour or more at a pressure of from about 20 psig to about 100 psig.

5. The method of claim 1, further comprising providing a flow of a fluid along a path through the inlet, through the electrolytic reaction zone, and through the outlet.

6. The method of claim 1, further comprising providing a power supply and electrically connecting the power supply to the first resin-impregnated monolithic graphite electrode and the second resin-impregnated monolithic graphite electrode.

7. The method of claim 6, further comprising using the power supply to provide a direct current of about 0.25 amps per square inch to 1.5 amps per square inch of an electrolytic zone surface area of the electrolytic reaction zone at a voltage of from about 1 Volt DC to about 15 Volts DC.

8. The method of claim 6, further comprising using the power supply to reverse a polarity of a current supplied to the first electrode and second electrode on a cycle of from about one minute to about 1440 minutes per cycle.

9. The method of claim 1, further comprising providing an electrolytic solution supply system in fluid communication with the inlet.

10. The method of claim 9, wherein the electrolytic solution supply system comprises:
   a pressurized water supply including a water supply;
   a pressure regulator; and
   a flow regulator.

11. The method of claim 9, wherein the electrolytic solution supply system comprises:
   a mixture supply system comprising a mixture supply outlet, the mixture supply system comprising a first pump having a first pump outlet and a second pump having a second pump outlet;
   a pressurized water supply comprising a pressurized water supply outlet; and
   an in-line static mixer configured to mix a first component supplied from the mixture supply outlet, and the pressurized water supply from the pressurized water supply outlet.

12. The method of claim 11, further comprising:
   providing a supply comprising a sodium bromide solution in fluid communication with the first pump outlet; and
   providing a supply comprising a sodium chloride solution in fluid communication with the second pump outlet.

13. The method of claim 1, wherein the pressure differential is caused without using a vacuum source.

14. The method of claim 1, further comprising forming the first and second porous, monolithic plates.

15. The method of claim 14, wherein the forming the first and second porous, monolithic plates comprises, for each of the first and second porous, monolithic plates:
   isostatically pressing a mixture of isotropic petroleum coke and coal tar pitch at a pressure of about 10,000 psig, or greater, in a rubber mould to produce a green compact;
   heating the green compact in a furnace for a period of 1 day to 20 days at temperatures increasing from 600° C. to 1200° C. during the period, to form a carbon compact;
   impregnating the carbon compact with either coal tar pitch, or phenolic resin, via vacuum/pressure impregnation;
   recarbonizing the carbon compact by heating in a furnace for a period of 1 day to 20 days at temperatures increasing from 600° C. to 1200° C. during the period, to form a high density carbon compact; and
   graphitizing the high density carbon compact by heating in a furnace for 1 to 20 days at a temperature range of 3000° C. to 3500° C., to form the respective porous, monolithic plate.

16. The method of claim 15, wherein the causing the flowable, hardenable resin to flow through the first porous, monolithic plate comprises utilizing pressure in an anisostatic configuration.

17. The method of claim 1, further comprising forming the first and second porous, monolithic plates by a process comprising, for each of the first and second porous, monolithic plates:
   isostatically pressing a mixture of isotropic petroleum coke and coal tar pitch at a pressure of about 10,000 psig, or greater, in a rubber mould to produce a green compact;
   heating the green compact in a furnace for a period of 1 day to 20 days at temperatures increasing from 600° C. to 1200° C. during the period, to form a carbon compact;
   impregnating the carbon compact with either coal tar pitch, or phenolic resin;
   recarbonizing the carbon compact by repeating the furnace heating to form a high density carbon compact; and
   graphitizing the high density carbon compact by heating in a furnace for a period of 1 day to 20 days at a temperature range of 3000° C. to 3500° C., to form the respective porous, monolithic plate.

18. The method of claim 17, wherein the causing the flowable, hardenable resin to flow through the first porous, monolithic plate comprises utilizing pressure in an anisostatic configuration.

* * * * *